United States Patent
Schwarz et al.

(10) Patent No.: US 9,641,331 B2
(45) Date of Patent: May 2, 2017

(54) METHOD FOR CONVERTING A CONDITIONAL ACCESS CONTENT AND RECEIVER FOR THE IMPLEMENTATION FOR SAID METHOD

(71) Applicant: Nagravision S.A., Cheseaux-sur-Lausanne (CH)

(72) Inventors: Christian Schwarz, Vuarrens (CH); Brecht Wyseur, Penthalaz (CH)

(73) Assignee: NAGRAVISION S.A., Cheseaux-sur-Laussanne (CH)

( * ) Notice: Subject to any disclaimer, the term of this patent is extended or adjusted under 35 U.S.C. 154(b) by 130 days.

(21) Appl. No.: 14/572,438

(22) Filed: Dec. 16, 2014

(65) Prior Publication Data
US 2015/0172053 A1 Jun. 18, 2015

(30) Foreign Application Priority Data
Dec. 17, 2013 (EP) .................................... 13197754

(51) Int. Cl.
*H04L 9/00* (2006.01)
*H04L 9/14* (2006.01)
*H04L 9/06* (2006.01)

(52) U.S. Cl.
CPC .............. *H04L 9/14* (2013.01); *H04L 9/0637* (2013.01); *H04L 2209/16* (2013.01); *H04L 2209/76* (2013.01)

(58) Field of Classification Search
CPC ..... H04L 9/14; H04L 9/0637; H04L 2209/16; H04L 2209/76
See application file for complete search history.

(56) References Cited

U.S. PATENT DOCUMENTS 5,680,453 A * 10/1997 Akiyama ................ G06F 21/10
　　　　　　　　　　　　　　　　　　　　　705/52
7,706,532 B2 * 4/2010 Ito ....................... H04N 21/2347
　　　　　　　　　　　　　　　　　　　　　380/201

(Continued)

OTHER PUBLICATIONS

Amril Syalim et al. "Realizing Proxy Re-Encryption in the Symmetric World" ICIEIS 2011, Part I, CCIS 251, pp. 259-274.*

(Continued)

*Primary Examiner* — Joseph P Hirl
*Assistant Examiner* — Thomas Gyorfi
(74) *Attorney, Agent, or Firm* — Harness, Dickey & Pierce, P.L.C.

(57) ABSTRACT

A method is disclosed for converting a conditional access content. This method includes receiving, by a cryptographic module of a first receiver, the content encrypted according to the first encryption mode; choosing a first entry data of the combination of the first encryption mode choosing a second entry data of the combination of the second encryption mode inverting the first and second input data in order to process the content received by the cryptographic module of the first receiver, this processing including a decryption operation according to the first encryption mode, by using the entry data corresponding to the second encryption mode, and to process the content obtained during the previous processing step, this processing including an encryption operation according to the second encryption mode, by using the entry data corresponding to the first encryption mode.

9 Claims, 5 Drawing Sheets

(56) References Cited

U.S. PATENT DOCUMENTS

| | | | | |
|---|---|---|---|---|
| 2004/0146158 A1* | 7/2004 | Park | ............ | H04L 9/0637 380/37 |
| 2005/0188216 A1* | 8/2005 | Crispin | ............ | H04L 9/0637 713/190 |
| 2006/0126835 A1* | 6/2006 | Kim | ............ | H04L 9/0637 380/44 |
| 2011/0255689 A1* | 10/2011 | Bolotov | ............ | H04L 9/0631 380/42 |
| 2014/0157005 A1* | 6/2014 | Leventhal | ............ | H04L 9/0637 713/193 |
| 2014/0229734 A1* | 8/2014 | Yamanaka | ............ | H04L 63/0428 713/168 |
| 2015/0172053 A1* | 6/2015 | Schwarz | ............ | H04L 9/0637 380/28 |

OTHER PUBLICATIONS

Schneier, Bruce. "Applied Cryptography, 2nd Edition" © 1996 Bruce Schneier. Published by John Wiley and Sons Inc. Excerpts from pp. 30-31, 189-211, and 455-459.*

StackOverflow forum "Can you 'convert' ciphertext encrypted in CBC mode to ECB mode with known IV?" posts made between Jul. 16, 2010 and Mar. 24, 2011 (2 pages) http://stackoverflow.com/questions/3262156/can-you-convert-ciphertext-encrypted-in-cbc-mode-to-ecb-mode-with-known-iv.*

Cook D. L. and Keromytis A. D. : "Conversion Functions for Symmetric Key Ciphers", Journal of Information Assurance and Security, 2006, pp. 41-50.

Wikipedia, "Mode d'operation (cryptographie)", Jan. 28, 2014, 12 pages.

European Search Report for EP13197754 dated May 5, 2014.

* cited by examiner

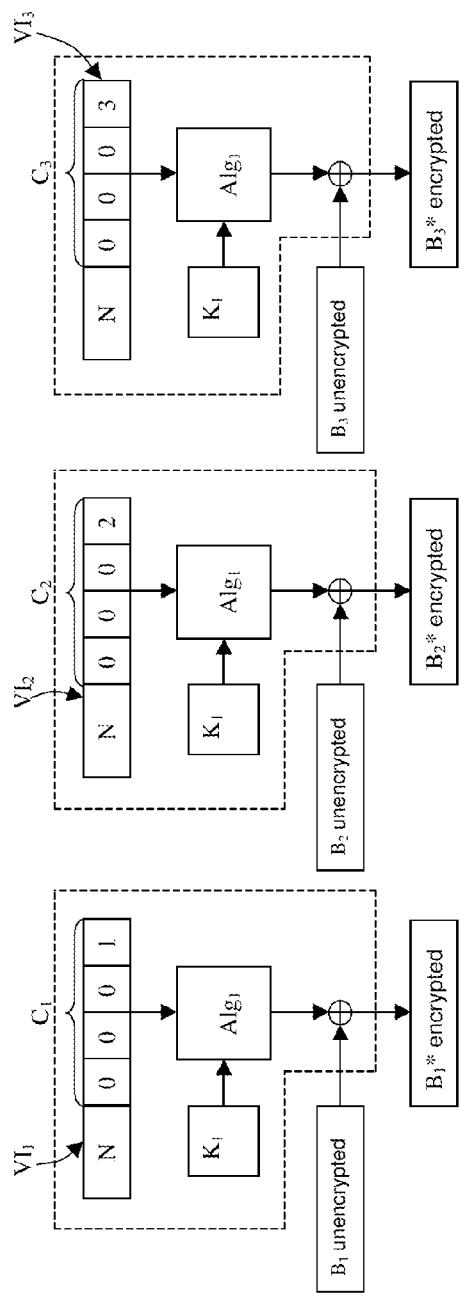
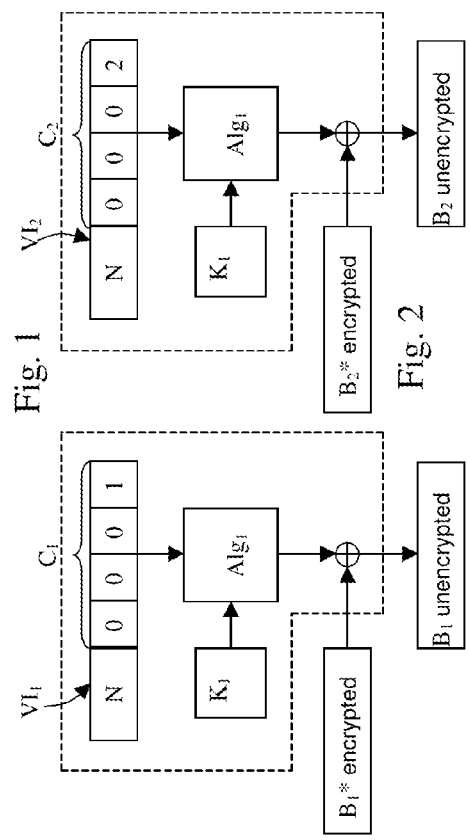
Fig. 1
Fig. 2

METHOD FOR CONVERTING A CONDITIONAL ACCESS CONTENT AND RECEIVER FOR THE IMPLEMENTATION FOR SAID METHOD

TECHNICAL FIELD

This invention relates to a method for converting a conditional access content having been encrypted in order to be able to be decrypted by a first receiver, by using a first encryption mode involving a commutative combination using at least two input data, in content encrypted in order to be able to be decrypted by a second receiver using a second encryption mode involving a commutative combination using at least two input data.

More particularly, this invention applies to a network of receivers in which the receivers communicate with each other by using formats or protocols which can be different according to the receivers involved in the communication. These formats or protocols can also be different between the communication established between a management centre and a network gateway serving as portal to this network on the one hand and between the communications established between the gateway of the network and the other members of this network on the other hand. The expression "member" here means a physical device receiving conditional access content, typically a receiver equipped with a cryptographic module. In this context, the gateway of the network can also be a receiver including cryptographic means such as in particular a cryptographic module.

This invention further concerns a receiver for the implementation of this method.

PRIOR ART

In the context of networks provided for the distribution of conditional access content such as in particular domestic networks, the receivers forming these networks frequently use different data formats, as well as different algorithms or encryption modes. As a result, when content is received by a first receiver of a domestic network such as in particular a network gateway, this first receiver often has to convert the conditional access content that it has received into content that one or several other receivers will be able to read.

In particular, conditional access content is generally sent according to a first format, encrypted with a first key, to a first receiver or to a network gateway, this transmission having been prepared in a management centre. When this content is received by the first receiver, it can use it if the content is addressed to it, or it can process it so as to make it utilizable for another receiver of the network if the content is addressed to this other receiver.

For this purpose, the conventional way to process the received content consists in decrypting it according to the parameters specific to the first receiver (key, cryptographic algorithm, . . . ) so as to obtain the unencrypted or clear content in this first receiver. The latter converts this unencrypted content into encrypted content that the second receiver will be able to decrypt. The content entering into the first receiver as well as the content exiting from the first receiver are thus encrypted. According to this process, the content is available in clear in the first receiver at a given time of the conversion. An ill-intentioned person having access to the receiver can thus in principle copy the unencrypted content and possibly distribute it to unauthorized users.

In the majority of the existing devices, the hardware in which the content is present unencrypted, is protected so that this content is hard to access. However there is a problem as the receivers are placed at the users' and the environment is accordingly not totally protected. A particularly competent user thus could access the unencrypted content despite the securities in the receiver.

For this reason, it is desirable to be able to convert conditional access content from one format into another without the content being available unencrypted during conversion.

DISCLOSURE OF THE INVENTION

This invention proposes to avoid the drawbacks of the above mentioned methods and devices by realizing a method in which conditional access content is converted from one format into another, without the content appearing unencrypted during conversion.

The object of the invention is reached by a conversion method as defined in the preamble, said method including the following steps:

receiving, by a cryptographic module of said first receiver, said content encrypted according to the first encryption mode;

choosing a first entry data of said combination of the first encryption mode, this first entry data being required for decrypting the content starting from the encrypted content and by using the first encryption mode;

choosing a second entry data of said combination of the second encryption mode, this second entry data being required for encrypting the content starting from the clear content and by using the second encryption mode;

inverting said first and second input data in order to:
  process the content received by the cryptographic module of the first receiver, this processing comprising a decryption operation according to the first encryption mode, by using said entry data corresponding to the second encryption mode, and to
  process the content obtained during the previous processing step, this processing comprising an encryption operation according to the second encryption mode, by using said entry data corresponding to the first encryption mode.

The present invention furthermore concerns a receiver arranged for converting a conditional access content having been encrypted in order to be able to be decrypted by a first receiver, by using a first encryption mode involving a commutative combination using at least two input data, into content encrypted in order to be able to be decrypted by a second receiver using a second encryption mode involving a commutative combination using at least two input data, wherein this receiver comprises:

means for receiving content encrypted according to the first encryption mode;

means for choosing a first entry data of said combination of the first encryption mode, this first entry data being required for decrypting the content starting from the encrypted content and by using the first encryption mode;

means for choosing a second entry data of said combination of the second encryption mode, this second entry data being required for encrypting the content starting from the clear content and by using the second encryption mode;

a cryptographic module arranged for inverting said first and second input data in order to:

process the content received by the cryptographic module of the first receiver, this processing comprising a decryption operation according to the first encryption mode, by using said entry data corresponding to the second encryption mode, and to process the content obtained during the previous processing step, this processing comprising an encryption operation according to the second encryption mode, by using said entry data corresponding to the first encryption mode.

The method of the invention uses at least two different encryption/decryption modes. One of these modes corresponds to that used by a first receiver and another mode corresponds to that used by a second receiver to access the unencrypted content.

Each of these encryption modes uses a set of specific cryptographic parameters such as in particular a key and a cryptographic algorithm.

According to the invention, conditional access content is converted according to specifications determined on the one hand for the transmission of content to the first receiver and on the other hand, for the transmission of the content from the first receiver to the second receiver. The specifications are in particular the content encryption mode, but also the keys and the used algorithms. The encryption mode can be chosen among a large number of encryption modes available. In particular, among the modes known, we can mention the modes CBC (Cipher block chaining), PCBC (Propagating Cipher block chaining), CTR (CounTeR), CFB (Cipher Feedback), OFB (Output Feedback), CCFB (Counter Cipher Feedback Mode), XEX (Xor-Encrypt-Xor) and XTS (XEX-based tweaked codebook mode with cipher text stealing).

A constraint applies to the encryption modes, this constraint having to be respected so that the method of the invention works. Indeed, it is necessary that the encryption modes include at least one commutative operation acting at least on one unencrypted block to be encrypted or on one encrypted block to be decrypted. Such a commutative operation can be an exclusive OR (XOR), a symmetrical encryption, an addition or a multiplication for example.

Let us suppose that conditional access content has been encrypted in a management centre or in an encryption module of a receiver. This content has been encrypted in order to be able to be decrypted in a first receiver by using a first encryption mode. Let us suppose that this content has to be converted to be able to be decrypted by a second receiver using a second encryption mode. In the method of the invention, if the above mentioned constraints are respected, it is possible to exchange elements specific to the first encryption mode with elements specific to the second encryption mode, without affecting the final result, this final result corresponding to the result obtained by a decryption according to the first encryption mode, followed by the reencryption according to the second encryption mode. This final result can be used in a second receiver to obtain the unencrypted content. On the other hand, the intermediate result, i.e. the result obtained after a first decryption step, will not give the content in clear. The conversion, i.e. the first decryption followed by a reencryption, is carried out in the first receiver while the receiver carrying out the second decryption is the final receiver which, if the rights are present, will be authorized to legally access the content. As a consequence the content will never be available unencrypted in the first receiver.

BRIEF DESCRIPTION OF THE DRAWINGS

This invention and its advantages will be better understood with reference to the enclosed drawings and to the detailed description of a particular embodiment, in which:

FIGS. 1 to 4 are explanatory diagrams illustrating the encryption and the decryption according to two encryption/decryption modes known from prior art;

MODES FOR THE REALISATION OF THE INVENTION

FIGS. 1 to 4 and 7 to 8 describe encryption/decryption modes well known from the prior art. These encryption/decryption modes are examples of modes usable in the process of the invention and are represented in order to allow a better comprehension of the invention.

FIG. 1 shows an encryption mode based on a counter, known under the acronym CTR (CounTeR). In this encryption mode, content to be encrypted is separated in blocks $B_i$ having a predefined fixed size. Each block is encrypted in an independent way from other blocks. Each block needs the use of an initial value $VI_i$ generally formed from a "nonce" N (Number Used Only Once), i.e. a random number used only once, and a counter value $C_i$ that can be incremented for each consecutive block.

This initial value VI is encrypted by means of a symmetrical encryption algorithm $Alg_1$ and by a key $K_1$. The initial value thus encrypted is then combined with a block $B_1$ to be encrypted. The combination is done by means of a commutative operation, written $\oplus$, in such a way that $X \oplus B_1 = B_1 \oplus X$. Such an operation is for example an exclusive OR (XOR), an addition, a symmetrical encryption or a multiplication. The result of this combination gives an encrypted block $B_{1*}$.

As previously mentioned, in the CTR encryption mode, each block is encrypted independently from the other blocks, the nonce N, the key $K_1$, the symmetrical encryption algorithm $Alg_1$ and the combination $\oplus$ being in principle the same for each block.

FIG. 2 shows the decryption of the block $B_{1*}$ encrypted by means of the CTR encryption mode. For decryption, it is sufficient to use the same steps as for encryption, replacing the unencrypted block $B_1$ used for the encryption, by the encrypted block $B_{1*}$.

Figure 3:
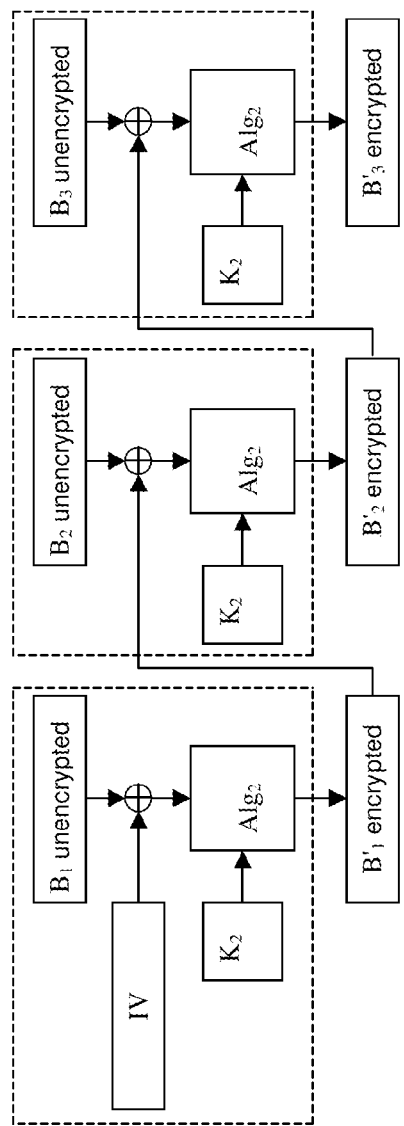

FIG. 3 shows an encryption mode known under the acronym CBC (Cipher Block Chaining). According to this encryption mode, the content to be encrypted is separated in blocks $B_i$ having a predefined fixed size. The encryption of the first block is generally done by using an initialization vector IV having the same dimension as the block to be encrypted. According to the CBC algorithm such as illustrated in FIG. 3, the first block to be encrypted $B_1$ is combined with the initialization vector IV. As in the CTR mode, this combination is a commutative operation, for example an exclusive OR (XOR) or an addition.

The result of this combination is encrypted by means of a symmetrical encryption algorithm $Alg_2$ and a key $K_2$, obtaining an encrypted block ($B'_1$). This encrypted block has the same size as the unencrypted block.

The encryption of a second block $B_2$ is done similarly to the encryption of the first block, by replacing the first block $B_1$ to be encrypted by the second block $B_2$ to be encrypted and the initialization vector IV by the first encrypted block $B'_1$. The method proceeds in this way for each of the blocks.

It can be seen that it is necessary to know the result of the encryption of a determined block for being able to encrypt the following block.

Figure 4:
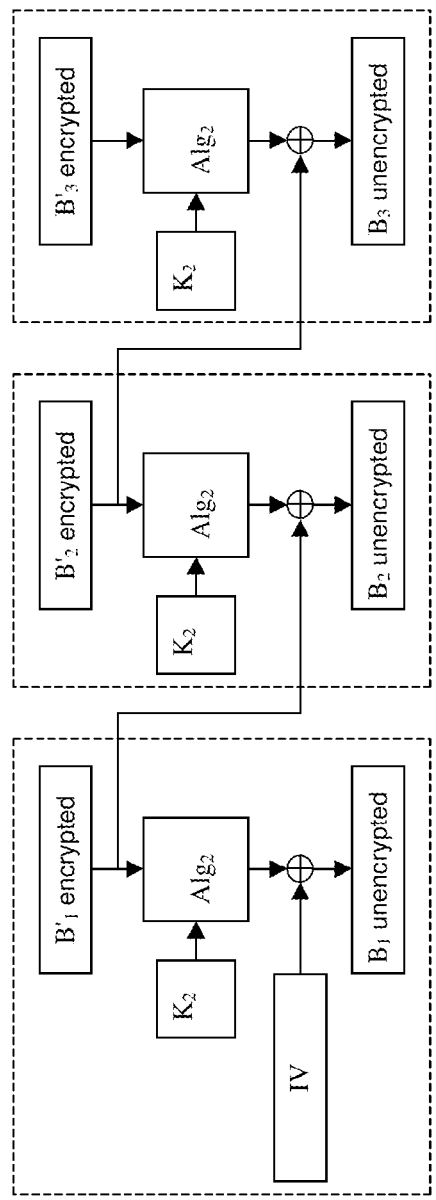

The decryption of an encrypted block by means of the CBC mode is disclosed schematically by FIG. 4. The first encrypted block $B'_1$ is first processed by means of the symmetrical encryption algorithm $Alg_2$ and of the key $K_2$. The result of this processing is combined with the initialization vector IV. The result of this combination gives the decrypted block $B_1$.

For the following encrypted block $B'_2$, the method proceeds in the same way as for block $B_1$, replacing the encrypted block $B'_1$ to be decrypted by the encrypted block $B'_2$ and the initialization vector IV by the encrypted block $B'_1$.

The initialization vector IV is the same as that used for the encryption. The commutative operation $\oplus$, the encryption key $K_2$ and the symmetrical encryption algorithm $Alg_2$ are also the same as those used during the encryption.

Figure 5:
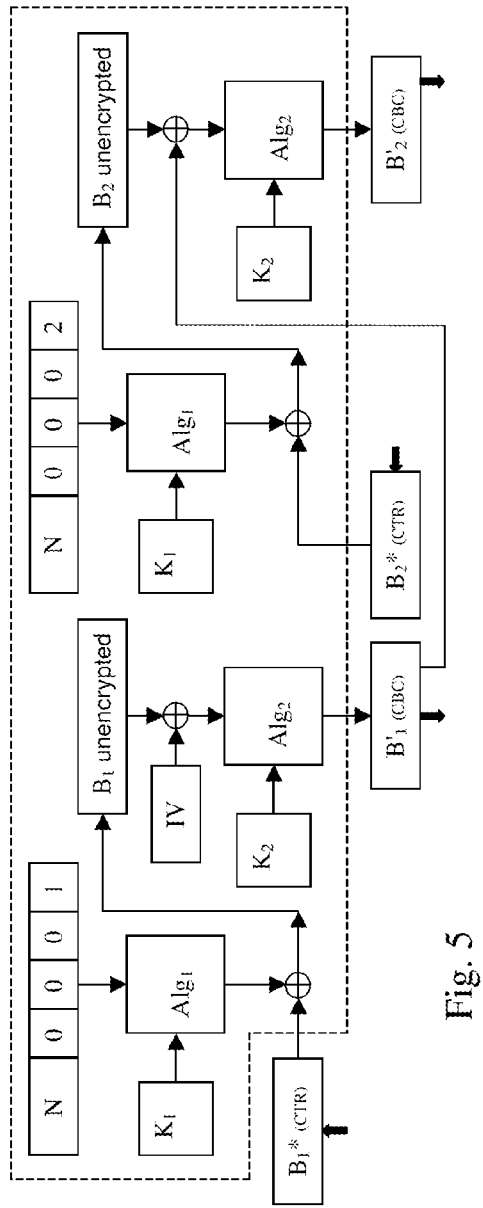
FIG. 5 shows a conversion process for conditional access content known from prior art.

FIG. 5 shows a conversion mode known from prior art, in which content having been encrypted according to a first encryption mode, here CTR, is received by a first receiver in which the content is converted into content which can be decrypted by using a second encryption mode, here CBC in a second receiver. In this embodiment, a first block, noted $B_{1*(CTR)}$, encrypted according to the CTR encryption mode, is received by the first receiver. The reception of the blocks is symbolized by an arrow pointing in direction of the block. The block $B_{1*(CTR)}$ is first decrypted by using the CTR encryption mode. This decryption is done according to the principle explained with reference to FIG. 2. The content is thus present unencrypted in the first receiver, at the end of the decryption. This unencrypted content is indicated with $B_1$ unencrypted. The unencrypted content is then encrypted by using the CBC encryption mode, in the way described with reference to FIG. 3. In this way, the content obtained at the exit of the first receiver can be transmitted to a second receiver in encrypted form, this second receiver being capable of obtaining the unencrypted content if it has the rights and other elements required for the decryption of the content.

The content obtained by reencryption with the CBC mode is indicated with $B'_{1(CBC)}$ and carries an arrow pointing away from the block, symbolizing the fact that the block can leave the cryptographic module of the first receiver.

In this embodiment, the following block is processed in a similar way to the first block, by replacing the entering block $B_{1*(CTR)}$ by an entering block $B_{2*(CTR)}$ and the initialization vector IV by the result of the processing of the previous block, i. e. the block indicated with $B'_{1(CBC)}$ in FIG. 5. For each entering block encrypted according to the CTR mode, there is an exit block, encrypted according to the CBC mode. The content is available unencrypted during the conversion.

Figure 6:
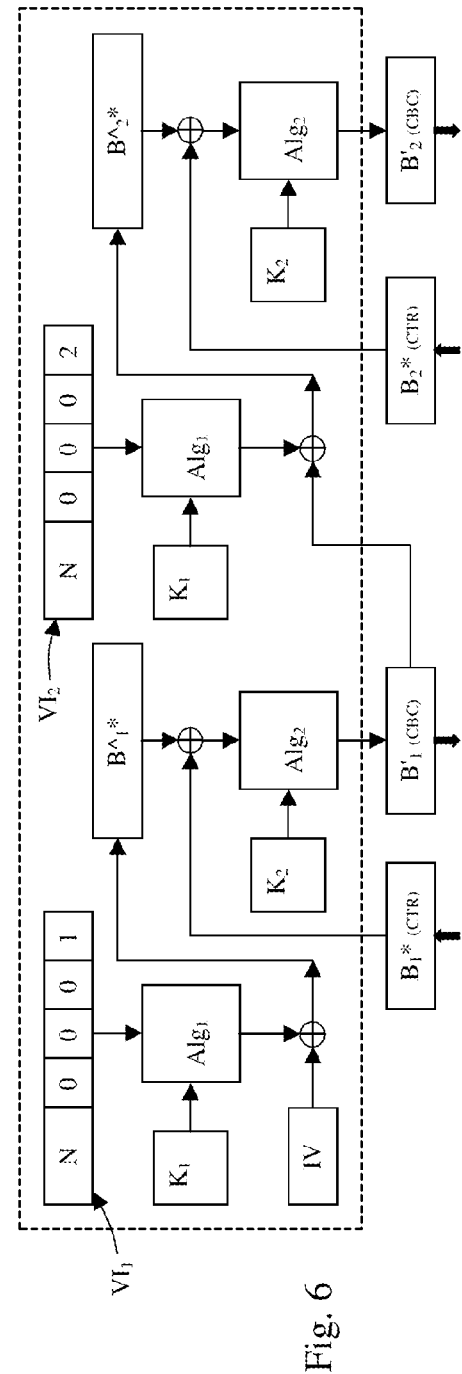
FIG. 6 shows, in a schematic way, one of the possible embodiments of the method for converting content according to this invention.

In the method of the invention disclosed in FIG. 6, unlike the methods of the prior art such as that described for example with reference to FIG. 5, the content is at no time available unencrypted in the first receiver. As in the embodiment explained with reference to FIG. 5, two "sets" of operations are chained so that the result of the first set of operations is used as entry of the second set of operations.

In the embodiment disclosed by this FIG. 6, content encrypted according to the CTR process, indicated with $B_{1*(CTR)}$, is received by the first receiver. The initial value $VI_1$ having served to encrypt this content, both the key $K_1$ and the encryption algorithm $Alg_1$ are known.

The initial value $VI_1$ is encrypted with the encryption algorithm $Alg_1$ and the encryption key $K_1$ in a cryptographic module of the decoder, to give an encrypted counter value. Instead of combining this encrypted counter value with the encrypted content $B_{1*(CTR)}$, which would lead to obtaining the unencrypted content, this encrypted counter value is combined with an initialization vector IV as it is used in the framework of the encryption according to the CBC mode.

This combination is done by means of the commutative operation $\oplus$ having served for the encryption for obtaining the encrypted block $B_{1*(CTR)}$. The result of this combination gives an encrypted block indicated with $\hat{B}_{1*}$. This encrypted block $\hat{B}_{1*}$ is combined with the encrypted content $B_{1*(CTR)}$ received by the first receiver, this combination having the same properties as the combinations mentioned previously.

The result of the combination is then processed by means of the symmetrical encryption algorithm $Alg_2$ previously mentioned and by the encryption key $K_2$. The result of this encryption leads to content $B'_{1(CBC)}$ that can be decrypted by a receiver knowing the key $K_2$, the symmetrical encryption algorithm $Alg_2$ and by using the CBC encryption mode.

When a following block, indicated with $B_{2*(CTR)}$, has to be processed so as to be converted into a block which can be decrypted according to the CBC mode, the block $B_{2*(CTR)}$ is first received by the first receiver. Like for the first block, the initial value $VI_2$ is processed by means of the algorithm indicated with $Alg_1$ and the key $K_1$. The result of this processing is combined with the exit block of the previous conversion, i. e. with the block indicated with $B'_{1(CBC)}$. This combination leads to an encrypted block indicated with $\hat{B}_{2*}$. This encrypted block is combined with the input block $B_{2*(CTR)}$, then the result of this combination is encrypted by means of the algorithm indicated with $Alg_2$ and the key $K_2$. The result gives an encrypted block which may be decrypted by the CBC mode.

The method takes place similarly for the following blocks and it can be seen that to each block entering, encrypted according to the CTR mode, corresponds an exiting block encrypted according to the CBC mode. It can also be seen that at no moment of the method, unencrypted blocks of content are available in the receiver.

In summary, the decryption according to one encryption mode, for example CTR, followed by the encryption according to another encryption mode, for example CBC, uses two combinations which are commutative operations. For each of the combinations, two input data are used for being combined among them and lead to an exit data. In the method of the invention, two values, corresponding to an entry data of each of the combinations, are inverted in relation to the succession of the decryption according to an encryption mode, followed by the encryption according to another encryption mode. This inversion means that the unencrypted content is at no time available in the first receiver, but that it can be obtained by a decryption in the second receiver.

Figure 7:
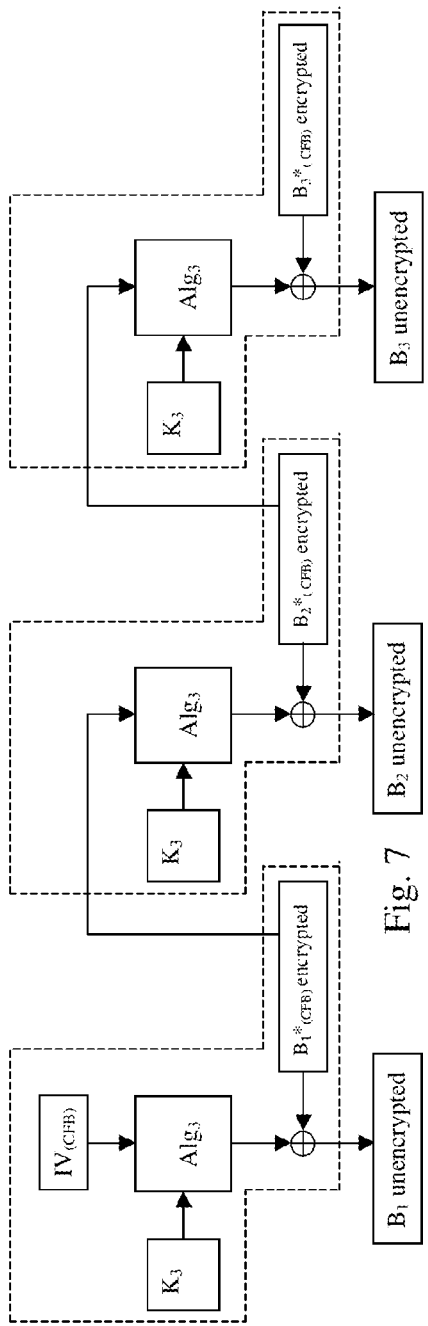
FIG. 7 shows the decryption of content according to a known decryption mode of prior art.

FIGS. 7 to 10 concern another example of the conversion method of the invention, using encryption/decryption modes different from the CBC and CTR modes. FIG. 7 shows the decryption of content having been encrypted by a mode known under the denomination of CFB (Cipher Feedback; retroaction encryption). According to this mode, an initialization vector $VI_{(CFB)}$ and an encryption key $K_3$ are used as entry values of an encryption algorithm $Alg_3$. The initialization vector $VI_{(CFB)}$ is encrypted by the encryption algorithm $Alg_3$, with the encryption key $K_3$.

The result of this encryption is combined with an encrypted block $B_{1*(CFB)}$, which leads to an unencrypted block of content $B_1$, this unencrypted block corresponding to the content of the encrypted block $B_{1*(CFB)}$. The encrypted block $B_{1*(CFB)}$ is used as entry value, with the encryption key $K_3$, for the encryption algorithm $Alg_3$ during the following iteration. The result of the encryption by the algorithm $Alg_3$, by the key K and by the block B1*(CFB) is combined with an encrypted block $B_{2*}$ to be decrypted. This combination leads to an unencrypted block $B_2$, corresponding to the decryption of the encrypted block $B_{2*}$. The method proceeds thus further, with at each step or at each iteration, the use of the encrypted block received during the previous iteration as entry value of the algorithm $Alg_3$, with the encryption key $K_3$.

Figure 8:
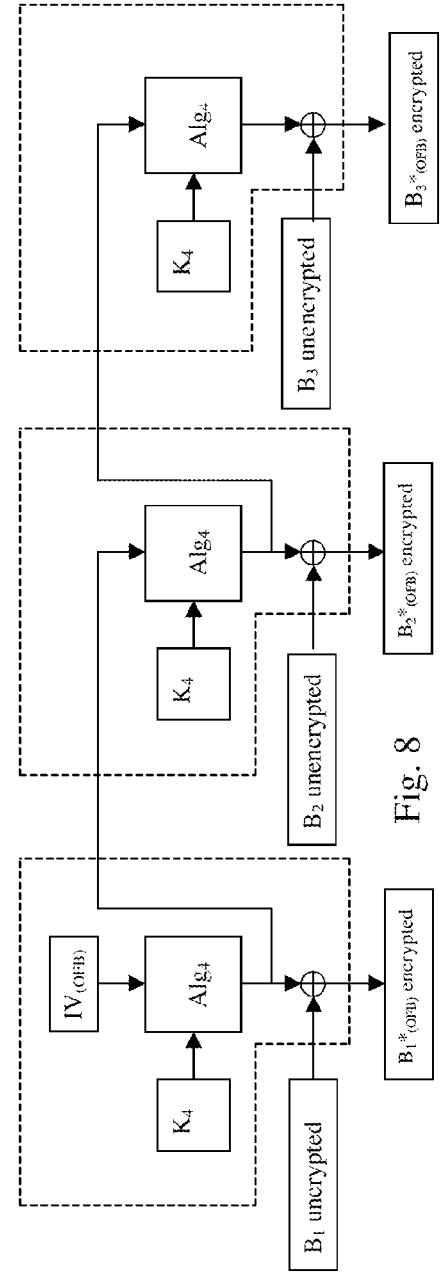
FIG. 8 represents the encryption of content according to another encryption mode of prior art.

FIG. 8 represents an encryption of content by means of a known encryption mode under the denomination OFB (Output Feedback). In this encryption mode, an initialization vector $VI_{(OFB)}$ is used with an encryption key $K_4$ as entry of an encryption algorithm $Alg_4$. The initialization vector $VI_{(OFB)}$ is encrypted by the algorithm $Alg_4$ with the encryption key $K_4$. The result of this encryption is combined with an unencrypted block $B_1$ of content to be encrypted. The result of this combination gives an encrypted block $B_{1*}$.

To encrypt the following block, the method explained above is reiterated with, instead of the initialization vector $VI_{(OBF)}$, the result of the encryption of this initialization vector by the algorithm $Alg_4$ with the encryption key $K_4$.

Figure 9:
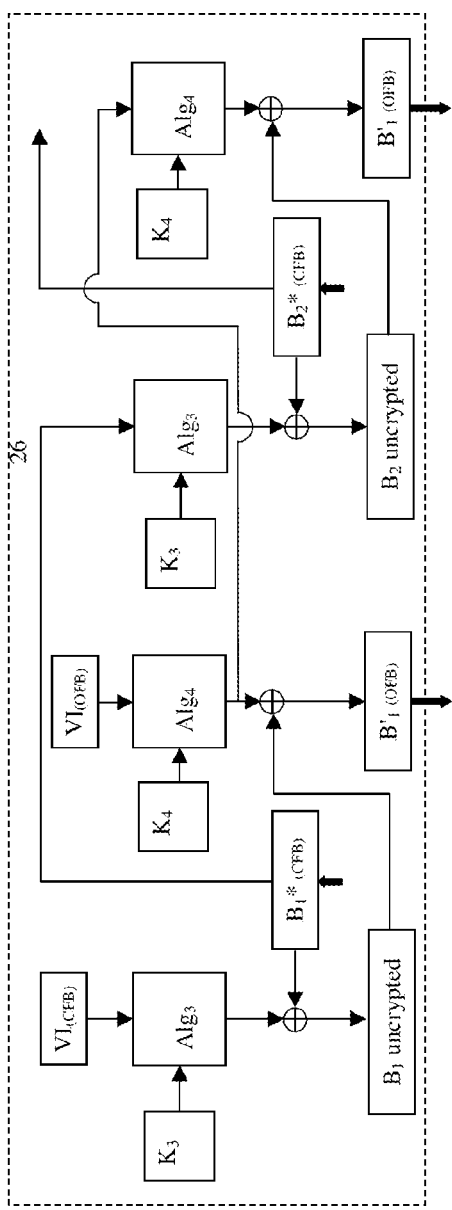
FIG. 9 shows a method for converting content known from prior art.

FIG. 9 shows an example for conversion of content which initially has been encrypted by using an encryption mode CFB and which has to be converted in order to be able to be processed by a receiver using an OFB encryption mode. This conversion example corresponds to an embodiment which might be used in the prior art. In this embodiment, the content is decrypted by using the CFB mode, as it has been described with reference to FIG. 7. The decrypted content is then encrypted by using the encryption mode OFB as described with reference to FIG. 8. The content appears unencrypted after the decryption step.

In this example, an initialization vector $VI_{(CFB)}$ is encrypted by means of an encryption algorithm $Alg_3$ and of an encryption key $K_3$. The result of this encryption is combined, by means of a commutative operation such as defined with reference to the previous examples, with a block of encrypted content $B1*_{(CFB)}$, received by the receiver in charge of the conversion. This block of encrypted content has been encrypted of course according to a CFB encryption mode. The result of the combination of the encrypted block $B1*_{(CFB)}$ with the encrypted initialization vector leads to a block $B_1$ corresponding to the unencrypted content of the encrypted block $B_{1*}$.

The method proceeds further with the encryption of the block thus decrypted, so as to encrypt it according to the encryption mode OFB. For this purpose, an initialization vector of the OFB mode, indicated $VI_{(OFB)}$, is first encrypted by means of an encryption algorithm $Alg_4$ and a key $K_4$. The result of this encryption is combined with the unencrypted block $B_1$, obtained during the previous decryption according to the CFB mode. In this way, one obtains a block of encrypted content, indicated $B1*_{(OFB)}$, this content being encrypted according to the OFB mode, the unencrypted content having given this encrypted block being identical to the unencrypted content having given the block encrypted according to the encryption mode CFB. The method proceeds further in the same way as previously, by replacing, at each iteration, the initialization vector of the CFB mode by the block of encrypted content received by the receiver during the previous iteration, and by replacing the initialization vector of the OFB mode by the result coming from the encryption by the algorithm $Alg_4$ and the key $K_4$, of the result obtained during the previous iteration.

Figure 10:
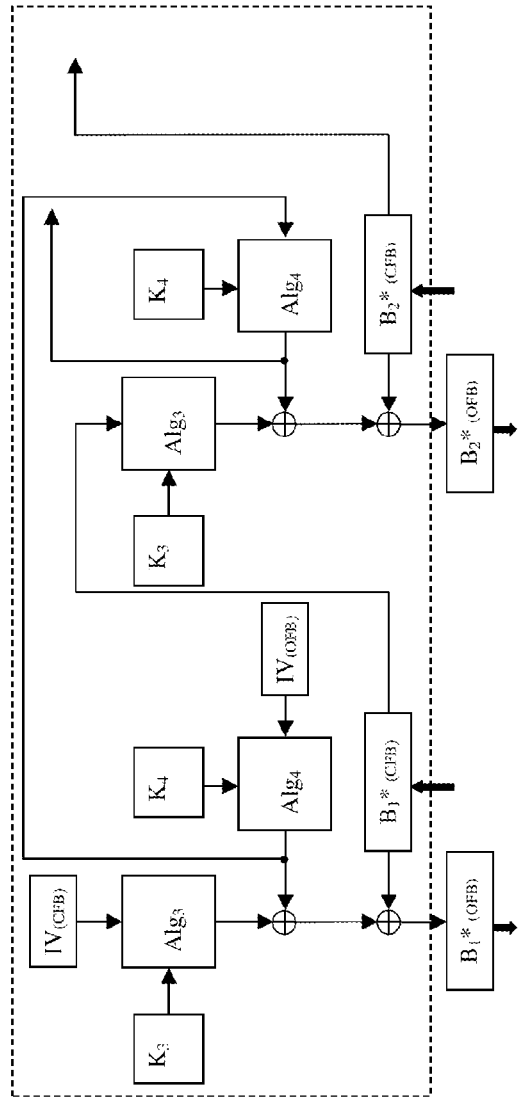
FIG. 10 shows, in a schematic way, another possible embodiment of converting a content according to this invention.

FIG. 10 represents an example of conversion of content initially encrypted by a CFB encryption mode, in a format which can be decrypted by a CFB decryption mode. Unlike the embodiment of FIG. 9, corresponding to an embodiment which could be used in the prior art, in the embodiment of the invention such as Illustrated to the FIG. 10 the content never appears unencrypted during conversion.

In a first step of the method, an initialization vector associated with the encryption mode CFB, $VI_{(CFB)}$ is encrypted with an encryption key $K_3$ by means of an encryption algorithm $Alg_3$. The result of this encryption is combined, not with a block of encrypted content as in the case of FIG. 9, but with the result of the encryption of an initialization vector associated with the encryption according to the OFB encryption mode, indicated with $VI_{(OFB)}$, by an algorithm $Alg_4$ and an encryption key $K_4$. The result of this combination is, for its part, combined with an encrypted block $B1*_{(CFB)}$, corresponding to the unencrypted content $B_1$, encrypted according to the encryption mode CFB. The result of this combination gives a block encrypted according to the OFB mode, corresponding to the unencrypted content of the block $B_1$.

The conversion method proceeds further by iteration, one of the input data of the algorithm $Alg_3$ corresponding to the CFB encryption mode being the block encrypted according to the CFB mode received during the previous iteration and one of the input data of the algorithm $Alg_4$ corresponding to the OFB encryption mode being the result of the encryption by the key $K_4$ and the encryption algorithm $Alg_4$ obtained during the previous iteration. According to this method, one of the elements associated with an encryption mode, here the initialization vector associated with the OFB encryption mode, is used in a conversion step associated with the other encryption mode, here the CFB mode. Likewise, another element associated with the CFB encryption mode, here the content of the encrypted block $B1*_{(CFB)}$, is used in a step associated with the other OFB encryption mode. By this inversion of the input data, the block to be converted never appears unencrypted in the conversion device, but it results encrypted in order to be able to be used by the related receivers.

The method of the invention has been described with a first example in which the content is received by the first receiver in an encrypted form according to the CTR encryption mode and is sent back to the second receiver in a form encrypted according to the CBC encryption mode. The invention is also described according to a second example in which the content received by the receiver in charge of the conversion has been encrypted according to the CFB encryption mode, then has to be converted in a mode of encryption according to the OFB mode. This invention is not limited to these embodiments. In particular, it can also be used if the CBC and CTR encryption modes are inverted. Likewise, other modes of encryption and decryption can be used, like for example the following:

a Cipher Block Chaining encryption (CBC);
a Propagating Cipher Block Chaining encryption (PCBC);
an encryption based on a counter (CTR; CounTeR);
a Cipher Feedback encryption (CFB);

an Output Feedback encryption (OFB);
a Counter Cipher Feedback Encryption Mode (CCFB);
an encryption according to the mode XEX (Xor-Encrypt-Xor); and
an encryption according to the XTS mode (XEX-based tweaked codebook mode with cipher text stealing).

as well as their variants. The order in which these encryption modes are used is arbitrary. To make the method of the invention work, it is necessary that the used encryption modes include a commutative operation such as for example an exclusive OR (XOR), a symmetrical encryption, an addition, or a multiplication. It is necessary that the method uses at least two different encryption modes and that the commutative operations are carried out in the first receiver, with input data which are inverted in comparison with a decryption using the encryption mode having led to obtaining the encrypted block received by the first receiver, followed by a reencryption according to an encryption mode destined for the second receiver. This allows to ensure that the content will not be available unencrypted in the first receiver, but that it will be accessible unencrypted in the second receiver, if the latter has the access rights and the required decryption means.

There is a large number of possible variants which allow to reach the object of the invention. In practice, it is relatively simple to verify if a variant works. It is sufficient to introduce encrypted content in the cryptographic module of the first receiver, to process these encrypted content, to verify if the content appear unencrypted during the process and to verify if the content can be decrypted in the cryptographic module of the second receiver. The risk that the method works for a randomly generated block but that it does not work for all the blocks is extremely low. The test with only one block is thus sufficient to determine in a very reliable way if the method can be used or not.

It is possible to use more than two encryption modes, for example three. In this case, the input data of the combinations can be permuted in various ways. The only important thing is that the content do not appear unencrypted in the first receiver.

The invention claimed is:

1. A method for converting a conditional access content having been encrypted in order to be able to be decrypted by a first receiver, by using a first encryption mode involving a commutative combination using at least two input data, in content encrypted in order to be able to be decrypted by a second receiver using a second encryption mode involving a commutative combination using at least two input data, said first encryption mode being different from the second encryption mode, said method including the following steps:
receiving, by a cryptographic module of said first receiver, said content encrypted according to the first encryption mode;
choosing a first entry data of said combination of the first encryption mode, this first entry data being required for decrypting the content starting from the encrypted content and by using the first encryption mode;
choosing a second entry data of said combination of the second encryption mode, this second entry data being required for encrypting the content starting from the clear content and by using the second encryption mode;
inverting said first and second input data in order to:
process the content received by the cryptographic module of the first receiver, this processing comprising a decryption operation according to the first encryption mode, by using said entry data corresponding to the second encryption mode, and to
process the content obtained during the previous processing step, this processing comprising an encryption operation according to the second encryption mode, by using said entry data corresponding to the first encryption mode.

2. The method of claim 1, wherein said first and second encryption modes are selected among:
a Cipher Block Chaining encryption (CBC);
a Propagating Cipher Block Chaining encryption (PCBC);
an encryption based on a counter (CTR; CounTeR);
a Cipher Feedback encryption (CFB);
an Output Feedback encryption (OFB);
a Counter Cipher Feedback Encryption Mode (CCFB);
an encryption according to the mode XEX (Xor-Encrypt-Xor); and
an encryption according to the XTS mode (XEX-based tweaked codebook mode with cipher text stealing).

3. The method of claim 1, wherein said commutative operations are chosen among an exclusive Or (XOR), an addition, a symmetrical encryption or a multiplication.

4. The method of claim 1, wherein the first encryption mode is an encryption mode based on a counter (CTR), wherein the second encryption mode is a Cipher Block Chaining encryption mode (CBC), wherein the commutative operations for the two encryption modes are an exclusive OR, wherein said first entry data is a block ($B1^*_{(CTR)}$) encrypted according to a first encryption mode, received by the first receiver, wherein the second entry data is the result of the decryption according to the Cipher Block Chaining encryption mode (CBC) of the previous block, wherein the result of the decryption according to the Cipher Block Chaining encryption mode (CBC) of the previous block is used as entry data during a decryption operation according to the Counter Based encryption mode (CTR) and wherein the encrypted block ($B_{1*(CTR)}$) forming said first entry data is used as entry data for the encryption according to the second encryption mode.

5. The method of claim 4, wherein, if the result of the decryption according to the Cipher Block Chaining encryption mode (CBC) of the previous block is not available, this result is replaced with an initialization vector (IV).

6. The method of claim 1, wherein the first encryption mode is a Cipher Feedback encryption mode (CFB) and wherein the second encryption mode is an Output Feedback encryption mode (OFB).

7. The method of claim 6, wherein said first entry data is a block ($B_{1*(CFB)}$) encrypted according to a first encryption mode, received by the first receiver, wherein the second entry data is the result of the encryption according to the Output Feedback encryption (OFB), of a value resulting from the encryption of an initial value associated with said exit Output Feedback encryption mode (OFB) by an encryption key associated with this encryption mode.

8. The method of claim 7, wherein, if said value resulting from the encryption of an initial value associated with said Output Feedback encryption mode (OFB) by an encryption key associated with this encryption mode is not available, this value is replaced by the result of an encryption of an initialization vector by said encryption key associated with the Output Feedback encryption mode (OFB).

9. A first receiver comprising:
storage storing computer-readable instructions:
one or more processors configured to execute the computer-readable instructions such that the one or more processors are configured to, convert a conditional access content having been encrypted in order to be able to be decrypted by the first receiver, by using a first encryption mode involving a commutative combination using at least two input data, into content encrypted in order to be able to be decrypted by a second receiver using a second encryption mode involving a commutative combination using at least two input data, such that the converting includes, receiving content encrypted according to the first encryption mode;

choosing a first entry data of said combination of the first encryption mode, the first entry data being required for decrypting the content starting from the encrypted content and by using the first encryption mode;

choosing a second entry data of said combination of the second encryption mode, the second entry data being required for encrypting the content starting from the clear content and by using the second encryption mode, the second encryption mode being different than the first encryption mode; and inverting said first and second entry data in order to,
  process the received content by performing a decryption operation according to the first encryption mode, using the second entry data, to generate first processed content, and
  process the first processed content by performing an encryption operation according to the second encryption mode, using the first entry data.

* * * * *